(12) United States Patent
Marker et al.

(10) Patent No.: US 8,575,408 B2
(45) Date of Patent: Nov. 5, 2013

(54) USE OF A GUARD BED REACTOR TO IMPROVE CONVERSION OF BIOFEEDSTOCKS TO FUEL

(75) Inventors: Terry L. Marker, Palos Heights, IL (US); Timothy A. Brandvold, Arlington Heights, IL (US); Charles P. Luebke, Mount Prospect, IL (US)

(73) Assignee: UOP LLC, Des Plaines, IL (US)

( * ) Notice: Subject to any disclaimer, the term of this patent is extended or adjusted under 35 U.S.C. 154(b) by 881 days.

(21) Appl. No.: 12/750,057

(22) Filed: Mar. 30, 2010

(65) Prior Publication Data

US 2011/0245551 A1    Oct. 6, 2011

(51) Int. Cl.
  *C07C 1/00*    (2006.01)
  *C10G 3/00*    (2006.01)
(52) U.S. Cl.
  CPC .......... *C10G 3/46* (2013.01); *C10G 2300/1014* (2013.01); *C10G 2300/1011* (2013.01)
  USPC .............................. 585/240; 585/242; 44/605
(58) Field of Classification Search
  CPC .............. C10G 2300/1011; C10G 2300/1014; C10G 3/46
  USPC ..................... 585/240, 242; 44/605
  See application file for complete search history.

(56) References Cited

U.S. PATENT DOCUMENTS

| | | | |
|---|---|---|---|
| 3,696,022 A | 10/1972 | Hutchings | |
| 3,876,533 A * | 4/1975 | Myers | 208/251 H |
| 4,003,829 A * | 1/1977 | Burger et al. | 208/253 |
| 4,422,927 A | 12/1983 | Kowalczyk et al. | |
| 4,504,379 A | 3/1985 | Stuntz et al. | |
| 5,520,722 A | 5/1996 | Hershkowitz et al. | |
| 5,879,642 A | 3/1999 | Trimble et al. | |
| 6,106,702 A | 8/2000 | Sohn et al. | |
| 6,339,182 B1 | 1/2002 | Munson et al. | |
| 6,656,342 B2 | 12/2003 | Smith et al. | |
| 6,759,562 B2 | 7/2004 | Gartside et al. | |
| 7,473,349 B2 | 1/2009 | Keckler et al. | |
| 7,476,774 B2 | 1/2009 | Umansky et al. | |
| 7,625,432 B2 * | 12/2009 | Gouman et al. | 95/232 |
| 7,999,142 B2 * | 8/2011 | Kalnes et al. | 585/240 |
| 7,999,143 B2 | 8/2011 | Marker et al. | |
| 2002/0146358 A1 | 10/2002 | Smith et al. | |
| 2008/0029437 A1 | 2/2008 | Umansky et al. | |
| 2008/0051619 A1 | 2/2008 | Kulprathipanja et al. | |
| 2008/0194896 A1 | 8/2008 | Brown et al. | |
| 2009/0077867 A1 | 3/2009 | Marker et al. | |
| 2009/0301930 A1 * | 12/2009 | Brandvold et al. | 208/17 |
| 2009/0318737 A1 * | 12/2009 | Luebke | 585/253 |

FOREIGN PATENT DOCUMENTS

GB    1 019 133    2/1966

* cited by examiner

*Primary Examiner* — Nina Bhat
(74) *Attorney, Agent, or Firm* — Mark Goldberg

(57) ABSTRACT

The present invention involves a process for processing an acidic biorenewable feedstock comprising olefins, in which the acidic biorenewable feedstock is diluted with a deoxygenated feed to produce a diluted biorenewable feedstock and then is sent through a guard bed comprising a hydroprocessing catalyst to cause the olefins to be saturated with hydrogen and thereby to produce a treated biorenewable feedstock. This treated biorenewable feedstock can then be treated under standard hydroprocessing condition to produce an upgraded feedstock for transportation fuels.

13 Claims, No Drawings

USE OF A GUARD BED REACTOR TO IMPROVE CONVERSION OF BIOFEEDSTOCKS TO FUEL

BACKGROUND OF THE INVENTION

This invention relates to processes for obtaining hydrocarbons from biomass. More particularly, this invention relates to a process for hydroprocessing an acidic biomass feedstock in a guard bed under mild conditions to prevent undesired polymerization from occurring.

A process has recently been developed in which biofeedstocks are deoxygenated by addition of hydrogen to produce a highly-stable green diesel fuel with a higher cetane value, lower cloud point and lower emissions than biodiesel and traditional petrodiesel. This process is feedstock flexible in working with a wide range of biofeedstocks ranging from first generation vegetable oil options to second generation feedstock options such as algal oils and cellulosic feeds. The green diesel fuel that is produced is indistinguishable from traditional diesel fuel and can work as a drop-in replacement or as a valuable blend stock that will enhance the quality of the existing diesel pool. Since it is chemically similar to traditional diesel fuel, green diesel can be used in today's tanks, pipelines, trucks, pumps and automobiles without changes, which will save significant expense as demand for renewables grows.

However, it has been found that some of the biofeedstocks that are used to make green diesel have high levels of free fatty acids (FFA). This high acidity leads the FFAs to polymerize even though they are being hydroconverted under high pressure hydrogen. Unfortunately, this polymerization can result in plugging of the fixed bed reactor resulting in high pressure drop and even unit shutdown.

Another process that has been found to have a need to prevent the polymerization of acids is the hydroprocessing of pyrolysis oil. In a fast thermal process developed by Ensyn Technologies Inc. of Ottawa Canada, a biomass, such as forest residuals or agricultural by-products are rapidly heated to approximately 500° C. in the absence of oxygen. The biomass is vaporized and then rapidly quenched, typically yielding from 65 to 75 wt-% pyrolysis oil. This pourable liquid can then be upgraded to produce transportation fuels. One of the useful processes in making such transportation fuels is hydroprocessing. However, as with the processing of biofeedstocks to make green diesel, pyrolysis oil, due to its high intrinsic acidity, is susceptible to undesired polymerization. Therefore, it has been found necessary to develop a solution to process acidic feeds that polymerize before saturation of the olefins can be accomplished when running at normal hydroconversion conditions.

SUMMARY OF THE INVENTION

The present invention involves a process for processing an acidic biorenewable feedstock comprising olefins, in which the acidic biorenewable feedstock is diluted with a deoxygenated feed to produce a diluted biorenewable feedstock and then is sent through a guard bed comprising a hydroprocessing catalyst to cause the olefins to be saturated with hydrogen and thereby to produce a treated biorenewable feedstock. This treated biorenewable feedstock can then be treated under standard hydroprocessing condition to produce an upgraded feedstock for transportation fuels.

DETAILED DESCRIPTION OF THE INVENTION

In the present invention, a guard bed is used to saturate olefins with hydrogen before the olefins and other compounds have time to polymerize. The guard bed is run at lower temperatures than is customary in hydroprocessing reactors and at a high diluent level by recycling back product that has been completely deoxygenated to the reactor. The diluent lowers the overall acidity and the concentration of olefins of the feed.

The guard bed can be either a noble metal or a non-metal catalyst. In the case of the noble metal, the reaction can be run at extremely mild reaction conditions, such as between 100° and 250° C., about 345 $Nm^3/m^3$ (2000 scfb) and 1379 to 6895 kPa (200 to 1000 psi).

The hydrolysis process is operated over a hydrogenation catalyst, which comprises a metal on a support. A preferred hydrogenation catalytic metal is a noble metal, and especially one selected from the platinum group. The noble metal catalysts may include platinum, palladium, ruthenium, rhodium, osmium, iridium, silver or gold. Two noble metals that are preferred are platinum (Pt) and palladium (Pd). Supports for the catalyst include zeolites, molecular sieves, $Al_2O_3$, $SiO_2$, MgO, $ZrO_2$, $TiO_2$, mixed metal oxides and carbon. The diluted biorenewable feedstock is sent through a noble metal catalyst at a temperature from about 100° to 250° C., and at a pressure from about 1379 to 6895 kPa (200 to 1000 psi).

In an alternate embodiment, the hydrogenation catalyst can comprise a base metal on a support. Base metals useable in this process include nickel, chromium, molybdenum and tungsten. Other base metals that can be used include tin, indium, germanium, lead, cobalt, gallium and zinc. The process can also use a metal sulfide, wherein the metal in the metal sulfide is selected from one or more of the base metals listed. The diluted biorenewable feedstock can be sent through these base metal or nonnoble catalysts at temperatures ranging from about 225° to 285° C. and pressures from 1379 to 6895 kPa (200 to 1000 psi). This feedstock may comprise more than about 0.0005 wt % sulfur compounds.

In a further embodiment, the hydrogenation process catalyst can comprise a second metal, wherein the second metal is includes one or more of the metals: tin, indium, ruthenium, rhodium, rhenium, osmium, iridium, germanium, lead, cobalt, gallium, zinc and thallium.

In the practice of the invention, the biorenewable feedstock stream can be a liquid, particulate solid or a combined liquid/particulate solid feed stream. Useful biorenewable feedstocks may include but are not limited to lignin, plant parts, fruits, vegetables, plant processing waste, wood chips, chaff, grain, grasses, corn, corn husks, weeds, aquatic plants, hay, paper, paper products, recycled paper and paper products, and any cellulose containing biological material or material of biological origin. Lignocellulosic biomass, or cellulosic biomass consists of the three principal biopolymers cellulose, hemicellulose, and lignin. The ratio of these three components varies depending on the biomass source. Cellulosic biomass might also contain lipids, ash, and protein in varying amounts. The economics for converting biomass to fuels or chemicals depend on the ability to produce large amounts of biomass on marginal land, or in a water environment where there are few or no other significantly competing economic uses of that land or water environment. The economics can also depend on the disposal of biomass that would normally be placed in a landfill. Preferred biorenewable feedstocks are liquid phase biorenewable feedstocks including, but not limited to vegetable oils, pyrolysis oils and combinations thereof. The term pyrolysis oil or pyrolytic oil refers to liquid and solid (char) material extracted by destructive distillation from biomass and in particular dried biomass. The destructive distillation occurs in a reactor operating at a temperature of about 500° C. with subsequent cooling. Pyrolytic oil normally contains levels of oxygen that can be as high as 50 wt-% (due, in part, to a high water content of from about 8 to about 20 wt-% or more) and that are too high for it to be considered a hydrocarbon and, as such, it is distinctly different from similar petroleum products.

Biorenewable feedstocks, such as vegetable oils, pyrolysis oils and lignocellulosic biomass contain organic materials that have a high oxygen content in comparison to petroleum-derived hydrocarbons. Indeed, the biorenewable feeds will typically have an oxygen content of at least 5 wt-% and generally at least 20 wt-% with a maximum oxygen content of no more that about 50 wt-%.

In an alternative embodiment, the hydroconversion feed may include a mixture or conventional hydrocarbon-type hydroconversion feeds and one or more biorenewable feeds.

Where the biorenewable feedstock is or includes a solid particulate material, then the particles may be any size that can be processed in the chosen hydroconversion reaction zone. However, it is preferred that a particulate biorenewable feedstock will have a mesh size less than about 50, more preferably less than about 100 mesh and most preferably less than about 200 mesh (75 microns).

A guard bed using a catalyst comprising an alumina support with nickel and molybdenum metals was tested at temperatures of 270° C., pressures of 3477 kPa (500 psi) and a 6/1 recycle to feed ratio. This resulted in a stable system with no pressure drop buildup due to a lack of undesired polymerization. However, it was found that after one week at normal conditions of 315° C., 3477 kPa (500 psi), 655 Nm$^3$/m$^3$ (3800 scfb), with the same alumina support with nickel and molybdenum metals followed by HCT catalysts the reactor plugged when 100% FFA feed is used and the pressure drop reached 2758 kPa (400 psi).

A guard bed of KFR-22 that was tested at 270° C., 3477 kPa (500 psi) and a 6/1 recycle ratio after 2 weeks on stream had low pressure drop. However, when the recycle ratio was cut back to 4/1, the reactor began building pressure and reached 1724 kPa (250 psi) pressure drop across the reactor in 48 hours. The pressure was swung to dislodge the plug and then the system was returned to 6/1 recycle ratio. It performed well at low pressure drop.

The invention claimed is:

1. A process for processing an acidic biorenewable feedstock comprising olefins, said process comprising diluting said biorenewable feedstock with a deoxygenated feed to produce a diluted biorenewable feedstock and then sending said diluted biorenewable feedstock through a guard bed comprising a catalyst to cause said olefins to be saturated with hydrogen to produce a treated biorenewable feedstock wherein said diluted biorenewable feedstock comprises a ratio from about 1:1 to 20:1 of said acidic deoxygenated feed to said acidic biorenewable feedstock.

2. The process of claim 1 wherein said acidic biorenewable feedstock is selected from the group consisting of vegetable oils, pyrolysis oils and lignocellulosic biomass.

3. The process of claim 1 wherein said guard bed comprises a noble metal catalyst or a normoble catalyst.

4. The process of claim 3 wherein said noble metal catalyst is selected from the group consisting of platinum, palladium, ruthenium, rhodium, osmium, iridium, silver and gold.

5. The process of claim 4 wherein said noble metal catalyst is platinum or palladium.

6. The process of claim 3 wherein said normoble metal catalyst is selected from the group consisting of nickel, chromium, molybdenum, tungsten, tin, indium, germanium, lead, cobalt, gallium, and zinc.

7. The process of claim 6 wherein said normoble metal catalyst is selected from the group consisting of nickel, cobalt, molybdenum and combinations thereof.

8. The process of claim 6 wherein said normoble metal catalyst is a sulfide.

9. The process of claim 4 wherein said diluted biorenewable feedstock is sent through said guard bed at a temperature from about 100° to 250° C.

10. The process of claim 4 wherein said diluted biorenewable feedstock is sent through said guard bed at a pressure from about 1379 to 6895 kPa (200 to 1000 psi).

11. The process of claim 6 wherein said diluted biorenewable feedstock is sent through said guard bed at a temperature from about 225° to 285° C.

12. The process of claim 6 wherein said diluted biorenewable feedstock is sent through said guard bed at a pressure from about 1379 to 6895 kPa (200 to 1000 psi).

13. The process of claim 6 wherein said acidic biorenewable feedstock comprises more than 0.005% sulfur compounds.

* * * * *